No. 770,659. Patented September 20, 1904.

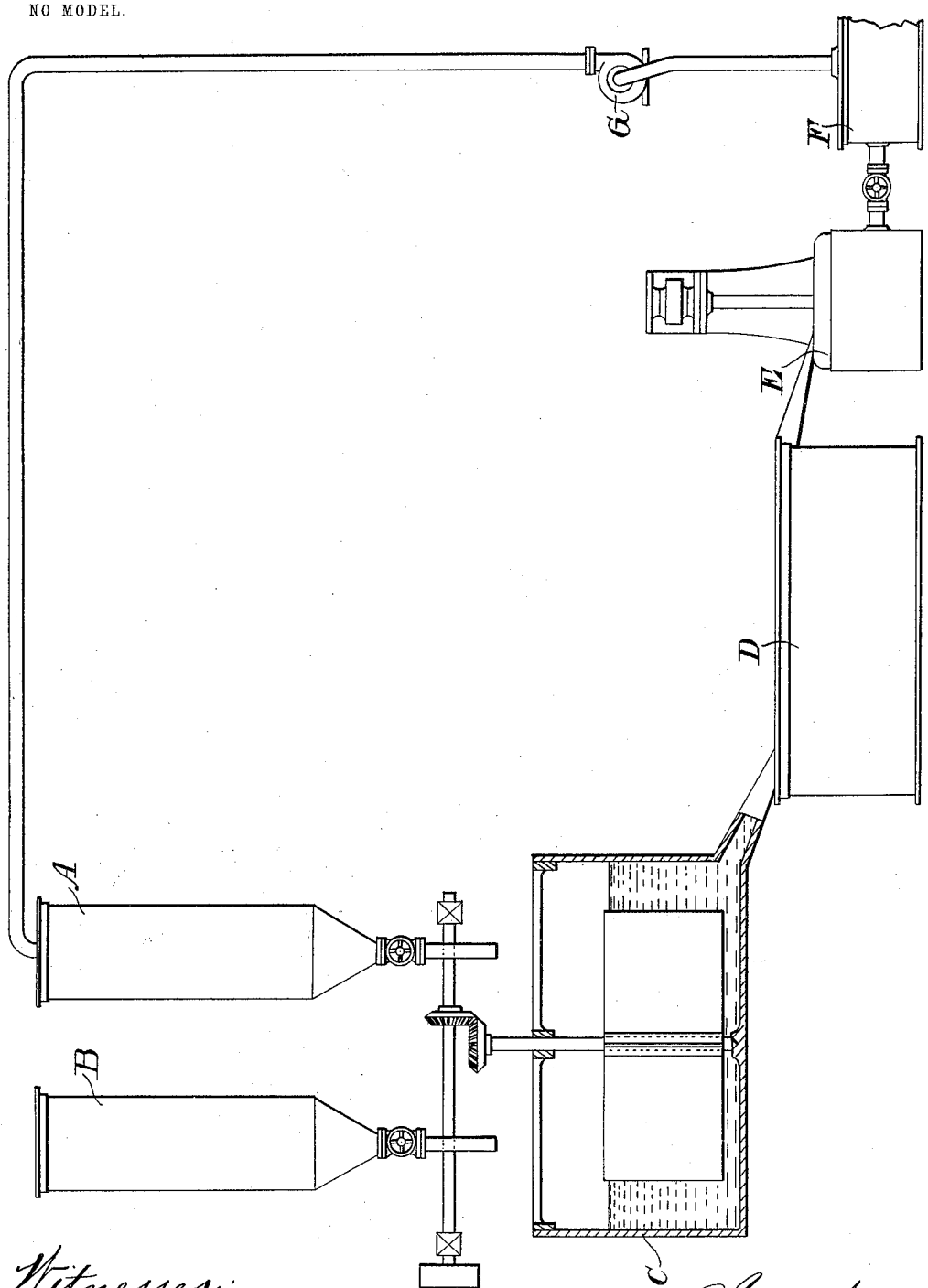

UNITED STATES PATENT OFFICE.

JOSEPH BARTON SCAMMELL, OF LONDON, ENGLAND.

SEPARATION OF METALS FROM THEIR ORES.

SPECIFICATION forming part of Letters Patent No. 770,659, dated September 20, 1904.

Application filed January 31, 1903. Serial No. 141,341. (No specimens.)

*To all whom it may concern:*

Be it known that I, JOSEPH BARTON SCAMMELL, a subject of the King of England, residing at London, England, have invented certain new and useful Improvements in or Relating to the Separation of Metals from Their Ores, of which the following is a specification.

The present invention relates to improvements in obtaining metals from their ores, the object being to separate the metallic particles from the ores by the use of chlorid of sulfur diluted with fish-oil, petroleum, or other greasy or oily matter.

To utilize the flotation power of oil in the separation of metallic minerals from gangue, a high degree of viscosity and cohesion is necessary. It is found that when oily or greasy matter—such as heavy petroleum, animal, vegetable, and fish oils—is treated with chlorid of sulfur chemical changes occur of a very complex nature accompanied with an alteration of the physical characteristics and nearly always by a considerable increase in their original viscosity and cohesion. The sulfur chlorid is itself destroyed in the reactions which take place in the treatment.

The alteration in physical characteristics is not confined merely to an increase in viscosity or cohesion, as the oils so treated are found to adhere to and remove certain minerals which the original oil was incapable of attacking, even if such original oil had been thickened or increased in viscosity by dissolving paraffin or waxes therein. In other words, a wider range is secured for the oil-flotation system. For example, heavy petroleum-oils incapable or only imperfectly capable of separating zinc-blende from its gangue even when strengthened by the addition of solid paraffin are found to effect such separation far more completely after treatment with sulfur chlorid. The same remark applies to the separation of dirty or oxidized pyrites and of certain oxidized lead minerals from gangue.

With pulps having a large proportion of minerals, as in the case of copper, lead, or zinc ores, the prepared oil should be made thick and viscous to produce the necessary power of flotation; but with pulps in which the percentage of mineral is small, as with gold ores, the oil need not be thickened to the maximum extent. In the same way if the particles of mineral are coarse the oil should be specially viscous, while with fine particles the oil may be relatively thinner.

The accompanying drawing is a diagram representing one form of apparatus suitable for use in this process.

In carrying out this invention chlorid of sulfur is thoroughly mixed with oil or grease in a vessel A in the proportion of one part of chlorid of sulfur to from two hundred to four hundred parts of oil or grease, and the mixture is run in a continuous stream into a revolving dasher or churn C, together with a stream of finely-powdered ore suspended in water from a vessel B, and the whole is thoroughly agitated. After the lapse of a certain time, the length of which varies considerably according to the nature of the ore, the contents of the churn are run into settling-pans D, wherein the metallic particles will be found in combination with the sulfo-chlorinated oil floating on the top of the mixture in the pans. The compound can be skimmed off and the water left behind and the grease or oil after suitable treatment in a separator to separate it from the metallic particles can be again utilized by the addition of the proper proportion of chlorid of sulfur. The oil or grease is discharged from the separator into a receiver F and is thence forced by a pump G back to the vessel A. The proportions of the materials used and the nature of the oil or grease can be varied without departing from the spirit of this invention.

It is found that oils treated with chlorid of sulfur will take up minerals that cannot be recovered by the oils hitherto employed. For example, the present process is applicable to the concentration of blende and of pyrites having a film of oxid on the surface which would not be separated by the thick mineral oils at present used.

What I claim as my invention, and desire to secure by Letters Patent, is—

1. The process of separating metals from their ores which consists in bringing finely-ground ore suspended in water into contact with chlorid of sulfur diluted with oily or greasy matter whereby the metallic particles combine with the sulfo-chlorinated grease.

2. The process of separating metals from their ores which consists in bringing finely-ground ore suspended in water into contact with chlorid of sulfur diluted with the oily or greasy matter and agitating the mixture whereby the metallic particles combine with the sulfo-chlorinated grease.

3. The process of separating metals from their ores which consists in bringing finely-ground ore suspended in water into contact with chlorid of sulfur diluted with oily or greasy matter, agitating the mixture whereby the metallic particles combine with the sulfo-chlorinated oil or grease and skimming off from the mixture the compound of metal, chlorid of sulfur and oil which floats.

4. The process of separating metals from their ores which consists in bringing finely-ground ore suspended in water into contact with chlorid of sulfur diluted with oily or greasy matter, agitating the mixture whereby the metallic particles combine with the sulfo-chlorinated oil, skimming off from the mixture the compound of metal, chlorid of sulfur and oil which floats and separating the grease or oil in order that it may be employed again.

5. The process of separating metals from their ores which consists in bringing finely-ground ore suspended in water into contact with chlorid of sulfur diluted from two hundred to four hundred times with oily or greasy matter whereby the metallic particles combine with the sulfo-chlorinated oil.

In testimony whereof I have signed my name to this specification in the presence of two subscribing witnesses.

JOSEPH BARTON SCAMMELL.

Witnesses:
T. J. OSMAN,
W. M. HARRIS.